Feb. 2, 1971 J. L. MUELLER 3,560,961

HIGH ACCURACY MULTITURN DIGITAL ENCODER

Filed July 3, 1967 2 Sheets-Sheet 1

United States Patent Office 3,560,961

Patented Feb. 2, 1971

3,560,961

HIGH ACCURACY MULTITURN DIGITAL ENCODER

John L. Mueller, New York, N.Y., assignor to Collectron Corporation, New York, N.Y.

Filed July 3, 1967, Ser. No. 650,881
Int. Cl. H03k *13/00;* G08c *9/00*
U.S. Cl. 340—347 2 Claims

ABSTRACT OF THE DISCLOSURE

A multiturn digital encoder of the type in which a first drum or disc is rotated $n$ integer revolutions for each revolution of a second drum or disc, in which the accuracy of the code pattern on the faster moving directly driven drum is superimposed upon that of the slower moving drum to eliminate ambiguity and the need for electronic circuitry to correct the same.

This invention relates generally to the field of multiturn digital encoders of a type in which a first drum or disc rotates $n$ integer revolutions for each revolution of a second drum or disc, each drum or disc having an electrically conductive code pattern on a moving surface thereof, the patterns being selectively electrically interconnected to obtain a digital indicia of the angular position of the slower moving drum or disc. Devices of this type are known in the art, and in the absence of additional electronic circuitry to correct errors and ambiguities, the operation of such devices has not been entirely satisfactory.

It is among the principal objects of the present invention to provide a high accuracy multiturn encoder of the above type employing structure which permits the superimposition of the accuracy of a directly driven digital code pattern over a code geared to that pattern.

Another object of the invention lies in the provision of an improved multiturn encoder possessed of the above accuracy which may be inherently simple in operation, and requiring no logic circuitry from an electronic standpoint, as well as no unusually close tolerances in the mechanical components thereof.

A further object of the invention lies in the provision of an improved multiturn encoder which is inherently unambiguous in operation.

Yet another object of the invention lies in the provision of an improved multiturn encoder in which the cost of fabrication may be of a reasonably low order, directly comparable with existing prior art devices, thereby permitting consequent wide sale, distribution and use.

These objects, as well as other incidental ends and advantages, will more fully appear in the progress of the following disclosure and be pointed out in the appended claims.

In the drawings, to which reference will be made in the specification, similar reference characters have been employed to designate corresponding parts throughout the several views.

Before entering into a detailed consideration of the invention, a brief review of the theory of operation of conventional multiturn encoders is considered opposite.

In its simplest form, a multiturn encoder consists of a rotating digital code pattern connected to an input shaft, and a slower moving code pattern geared or otherwise operatively connected to said shaft. The code patterns may be on discs or drums, however, drums offer superior uniform mechanical characteristics, since the brush radius for each bit is identical.

Providing an accurate correlation between the geared drum readout and the angular position of the input shaft presents difficulties, primarily due to the necessary gearing empoyed. For an $n$-turn encoder, a gear ratio of $1{:}n$ is required between the input shaft and the slow moving drum. An angular error on this drum, as seen by the input shaft is multiplied by $n$. For example, suppose a close angular tolerance of plus or minus 0 degrees 10′ on the geared drum digital pattern. In a 16 turn encoder, the tolerance of this pattern on readout with respect to the input shaft angle would be 16 times 0 degrees 10′ or plus or minus 2 degrees 40′. In addition to this large tolerance error, there is a sizable contribution from the intrinsic error present in the gear train. Consequently, even with high pecision gearing and close manufacturing tolerances, an angular tolerance of the order of magnitude of minutes over a range of multiples of $2\pi$ (360 degrees) is extremely difficult, if not impossible, to obtain. Solutions to this problem have required complex brush assemblies and mechanisms incorporating logic circuitry which in turn have substantial space and power requirements.

In accordance with the present invention, a specialized code superimposes the tolerance of the directly driven digital pattern over the entire range of the geared drum. The code is simple, non-ambiguous, and requires no logic circuitry.

Figure 1:
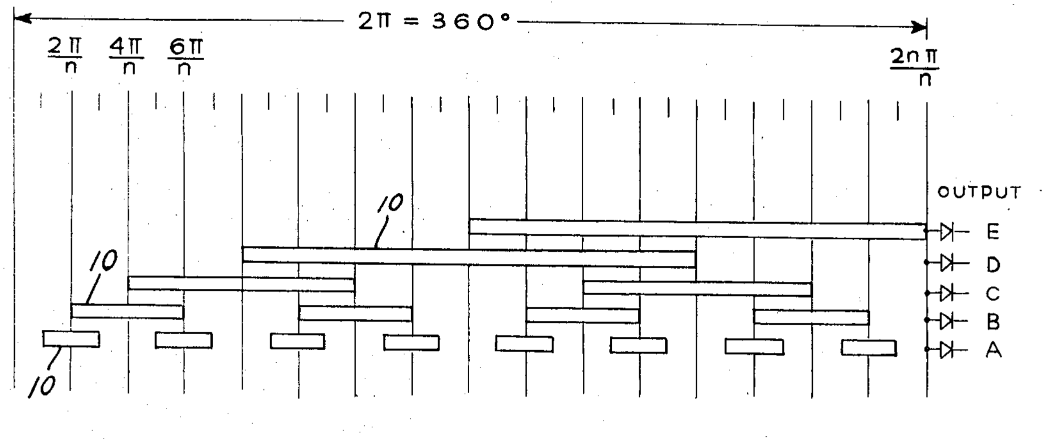
Fig. 1 PRIOR ART
FIG. 1 is a schematic view of a conventional code pattern, as commonly used in the prior art.

Referring now to FIG. 1 in the drawings, there is illustrated a typical non-repeating digital code pattern which rotates once for $n$ complete input shaft revolutions, and requires at least one conducting segment of length $2\pi/n$. A "gray" code for an $n$-turn encoder is illustrated ($n=16$ is shown). The 0 degree location is phased with respect to the 0 degree location of the fine code on the direct drum, and each conducting strip or segment, generally indicated by reference character 10 commences and terminates at some integer multiple of $2\pi/n$.

Figure 2:
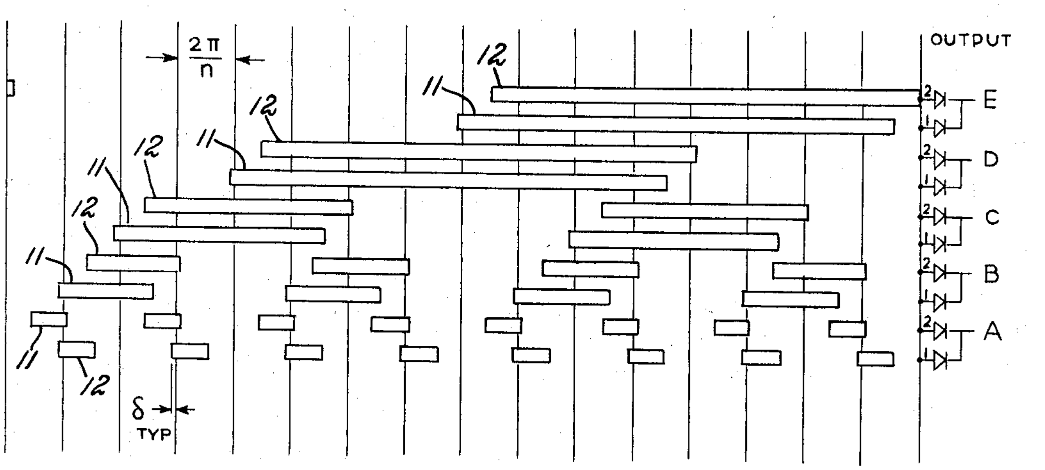
FIG. 2 is a schematic view of the code pattern shown in FIG. 1, and modified in accordance with the present invention.

Referring to FIG. 2, the code pattern shown in FIG. 1 is modified, in accordance with the present invention, so that each strip or segment 10 is split into two strip portions or segments, including a first plurality designated by reference character 11, and a second plurality designated by reference character 12. The portions 11 and 12 are arranged in juxtaposed spaced, parallel, and staggered relation. Each of the first plurality of portions 11 leads the corresponding segment 10 by a predetermined amount, and each of the second plurality 12 trails the corresponding segment 10 by the same amount. The amount of overlap indicated in the drawing by reference character delta ($\delta$) accommodates the angular error in the gearing (not shown) and its range is:

$$[\pi/n-t]>\delta>t$$

Where $t$ is the maximum angular tolerance which can be accommodated between the input shaft (direct drum) and the geared drum. The quantity $t$ also accounts for the brush location variations and segment position tolerances.

Figure 3:
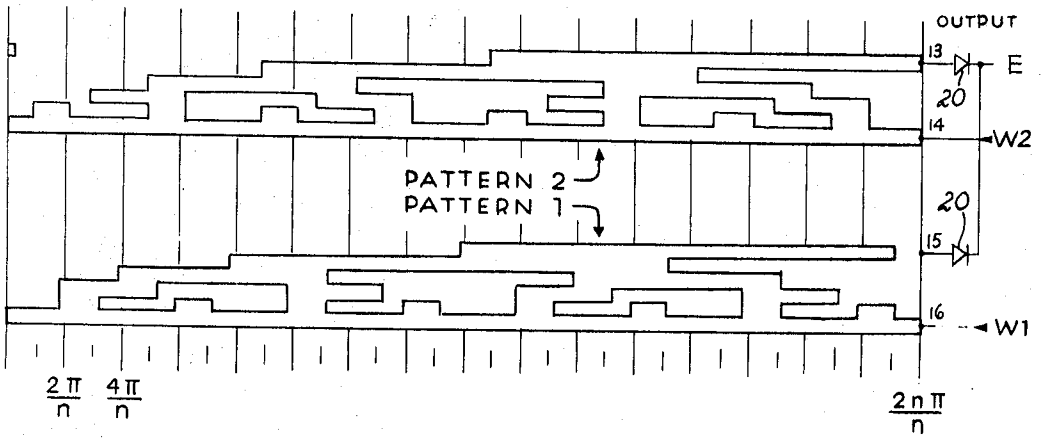
FIG. 3 is a similar schematic view showing certain of the components of FIG. 2 in electrically interconnected relation for simplified manufacture.
Figure 4:
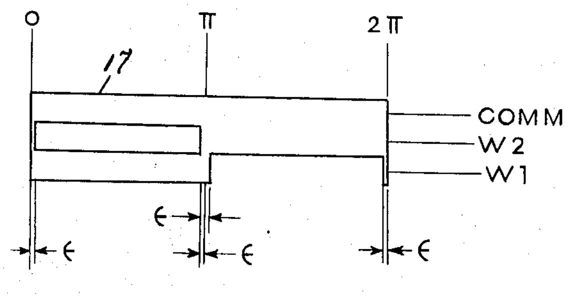
FIG. 4 is a schematic view corresponding to that seen in FIG. 3, but showing a second code pattern used on a second code wheel.

Referring to FIG. 3, all of the portions 11 are interconnected electrically, for convenience in manufacture, and are designated by the legend "pattern 1." Similarly, the portions 12 are interconnected and placed in juxtaposed relation and identified by legend "pattern 2." It will be understood that patterns 1 and 2 are the precise electrical equivalent of the code illustrated in FIG. 2, and by forming the conductive portions in the manner shown in FIG. 3, the number of brushes required is considerably reduced. Thus, all pattern 1 portions occupy the first half of the $2\pi/n$ interval, while all those of pattern 2 occupy the second half thereof. Patterns 1 and 2 are electrically insulated from each other on the drum, and the output of each is connected to brushes 13 and 15 through isolation diodes 20.

Figure 5:
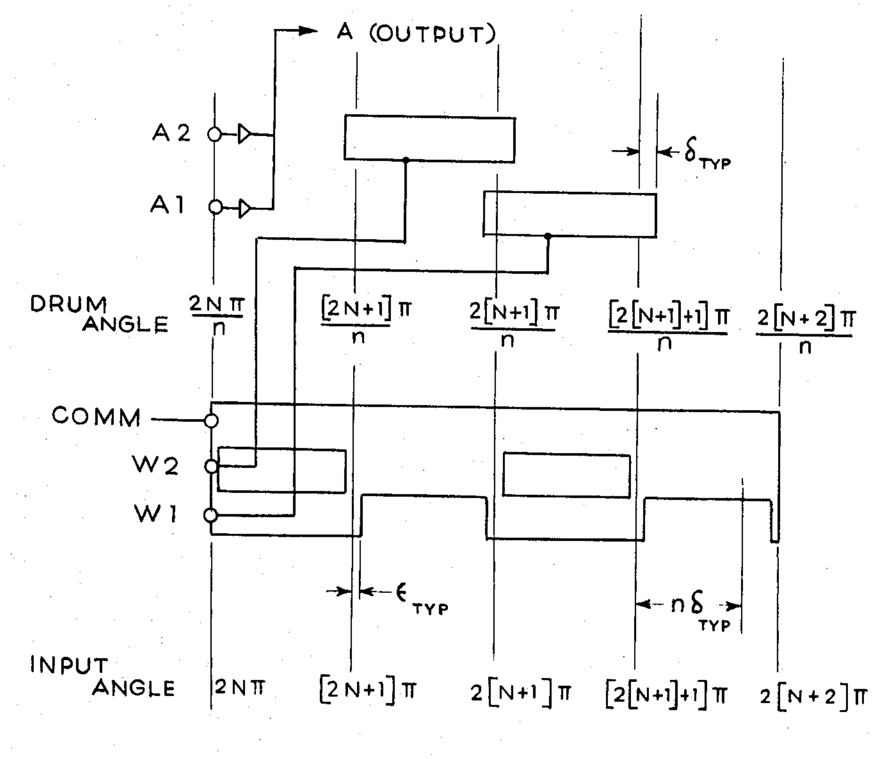
FIG. 5 is an enlarged schematic view showing the cooperation of the code patterns shown in FIGS. 3 and 4.
Figure 5:
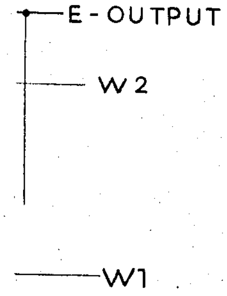

Referring to FIG. 5 in the drawings, the operation of generally indicated by reference character 17 is positioned upon the directly driven drum (not shown). Brushes $w1$, and $w2$ are connected, respectively to pattern 1 and pattern 2. The portion or segment length tolerance, which forms a practical precision manufacturing consideration approaches 0 degrees, and is indicated by the symbol ($\epsilon$).

OPERATION

Referring to FIG. 5 in the drawings, the operation of the embodiment may be considered. FIG. 5 illustrates the input shaft rotation from position $2n\pi$ to $2[n+2]\pi$, and the resulting rotation of the geared drum.

In FIG. 5, the output is indicated by reference character A, and is the additive output of A1 and A2. A typical error due to manufacturing tolerances is designated by $\epsilon$ typ as is the overlap designated by $\delta$ typ logically, output A is equal to (brush $w$1 and brush A1) or (brush $w$2 and brush A2). This may be written $$A \text{ is equal to } (w\mathbf{1}.\mathbf{A1})+(w\mathbf{2}.\mathbf{A2})$$

As summarized in the following truth table, the output reads 1 from $(2N+1)\pi-\epsilon$ to $[2(N+1)+1]\pi+\epsilon$ and reads 0 from $[(2N+1)+1\pi+\epsilon$ to $[2(N+1)+3]\pi-\epsilon$. Similarly, the other outputs read 1 for the required interval $+2\epsilon$ ($\epsilon$ added to both ends of the interval) and 0 for that required interval $-2\epsilon$ ($\epsilon$ subtracted from both ends of the interval).

Thus, the tolerance of the direct drum is maintained on the geared drum output. Further, the tolerance not being a function of $n$ or N, is constant for all $n$ input revolutions. As the logic permits only two possible states for the entire code at the transition point, it is non-ambiguous.

TRUTH TABLE

[Output A=/w1·A1] plus [w2·A2]

| Input shaft angle | w1 | A1 | w1·A1 | w2 | A2 | w2·A2 | A |
|---|---|---|---|---|---|---|---|
| $\phi$ | | | | | | | |
| $2N\pi<\phi<2N\pi+\epsilon$ | 1 | 0 | 0 | 1 | 0 | 0 | 0 |
| $2N\pi+\epsilon<\phi<(2N+1)\pi$-nS | 1 | 0 | 0 | 0 | 0 | 0 | 0 |
| $[2N+1]\pi-nS\leq\phi<(2N+1)\pi-\epsilon$ | 1 | 0 | 0 | 0 | 1 | 0 | 0 |
| $[2N+1]\pi-\epsilon\leq\phi\leq[2N+1]\pi+\epsilon$ | 1 | 0 | 0 | 1 | 1 | 1 | 1 |
| $[2N+1]\pi+\epsilon<\phi<2[N+1]\pi-\epsilon$ | 0 | 0 | 0 | 1 | 1 | 1 | 1 |
| $2[N+1]\pi-\epsilon\leq\phi\leq2[N+1]\pi+\epsilon$ | 1 | 1 | 1 | 1 | 1 | 1 | 1 |
| $2[N+1]\pi+\epsilon<\phi\leq2[N+1]\pi+nS$ | 1 | 1 | 1 | 0 | 1 | 0 | 1 |
| $2[N+1]\pi+nS<\phi<[2(N+1)+1]\pi-\epsilon$ | 1 | 1 | 1 | 0 | 0 | 0 | 1 |
| $[2(N+1)+1]\pi-\epsilon\leq\phi\leq[2(N+1)+1]\pi+\epsilon$ | 1 | 1 | 1 | 1 | 0 | 0 | 1 |
| $[2(N+1)+1]\pi+\epsilon\leq\phi\leq[2(N+1)+1]\pi+nS$ | 0 | 1 | 0 | 1 | 0 | 0 | 0 |
| $[2(N+1)+1]\pi+nS<\phi<2[N+2]-\epsilon$ | 0 | 0 | 0 | 1 | 0 | 0 | 0 |
| $2[N+2]-\epsilon\leq\phi\leq2[N+2]$ | 1 | 0 | 0 | 1 | 0 | 0 | 0 |

I wish it to be understood that I do not consider the invention limited to the precise details of structure shown and set forth in this specification, for obvious modifications will occur to those skilled in the art to which the invention pertains.

I claim:

1. In a multiturn digital encoder, a first directly-driven drum having a first code pattern thereon, a second drum interconnected in geared driven relation to said first drum such that it will revolve through a complete revolution for each predetermined number of complete revolutions of said first drum, said driven relation having a given degree of angular error, said second drum having a code pattern thereon, brush means interconnecting the code patterns on said first and second drums for electrical conduction therethrough; each of said patterns on said second drum consisting of a plurality of conductive strips aligned for conductive relation with said brush means, each of said strips being arranged in two strip portions disposed in juxtaposed parallel relation upon said second drum, one of each of said strip portions extending in leading relation with respect to the other, the other of said strip portions extending in trailing relation with respect to said first mentioned strip portion a like distance, the patterns on said first mentioned drum being divided into conductive and nonconductive areas arranged in staggered relation and overlying each other an amount determined by said degree of angular error.

2. Structure in accordance with claim 1, in which all of said first mentioned strip portions are connected in electrically conductive relation, and all of said second mentioned strip portions are connected in electrically conductive relation.

References Cited

UNITED STATES PATENTS 3,070,789 12/1962 Kristy et al. ---------- 340—347

3,286,251 11/1966 Byun et al. ---------- 340—347

MAYNARD R. WILBUR, Primary Examiner

J. GLASSMAN, Assistant Examiner